(12) United States Patent
Schliwa

(10) Patent No.: US 6,223,161 B1
(45) Date of Patent: Apr. 24, 2001

(54) METHOD FOR SETTING TERMINAL SPECIFIC PARAMETERS OF A COMMUNICATION TERMINAL

(75) Inventor: Peter Schliwa, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/147,924

(22) PCT Filed: Aug. 28, 1997

(86) PCT No.: PCT/DE97/01877
§ 371 Date: Mar. 18, 1999
§ 102(e) Date: Mar. 18, 1999

(87) PCT Pub. No.: WO98/12857
PCT Pub. Date: Mar. 26, 1998

(30) Foreign Application Priority Data

Sep. 18, 1996 (DE) ............................................. 196 38 114

(51) Int. Cl.$^7$ .................................................. G10L 15/22
(52) U.S. Cl. ........................... 704/275; 704/247; 704/258
(58) Field of Search ..................................... 704/275, 200, 704/270, 231, 246, 247, 252, 258, 271, 272

(56) References Cited

U.S. PATENT DOCUMENTS

| | | | |
|---|---|---|---|
| 4,439,638 | 3/1984 | Seligsohn et al. | 379/199 |
| 5,335,261 | 8/1994 | Fujinaka | 455/563 |
| 5,852,804 | * 12/1998 | Sako | 704/275 |
| 5,878,394 | * 12/1998 | Muhling | 704/275 |

FOREIGN PATENT DOCUMENTS

| | | | |
|---|---|---|---|
| 36 08 497 | 9/1987 | (DE) | H04M/1/274 |
| 94 15 045 | 12/1994 | (DE) | H04M/1/60 |
| 0 194 387 | 9/1986 | (EP) | H04M/1/27 |
| 0 618 710 | 5/1994 | (EP) | H04M/1/27 |
| 0 676 882 | 11/1995 | (EP) | H04M/1/27 |

OTHER PUBLICATIONS

Spracherkennung und Sprachsynthese für Dienste von Nebenstellenanlagen—Mulia—vol. 59, No. 3 1985.
Sprachgesteuerter Rufnummerngeber—Elektrisches Nachrichtenwesen, vol. 59, No. 3 1985.
Produktschau—Telekommunikationsanlagen—Bd. 46 1993 (12).

* cited by examiner

*Primary Examiner*—Richemond Dorvil
(74) *Attorney, Agent, or Firm*—Schiff Hardin & Waite

(57) ABSTRACT

In a method for setting terminal-specific parameters of a communication terminal, a speech recognition device is activated to convert acoustic signals into a data sequence to be compared to a reference pattern corresponding to a particular speech command allocated to a particular terminal-specific parameter. A speech command is input by an operator and the speech recognition device determines whether there is agreement between the operator input speech command and with said particular speech command allocated to said particular terminal-specific parameter. If agreement is determined a setting mode is activated for said parameter by a control unit. The terminal then outputs an indication concerning the activated setting mode and requests input of a desired parameter setting. The operator then inputs the desired parameter setting and the control unit sets the parameter.

23 Claims, 4 Drawing Sheets

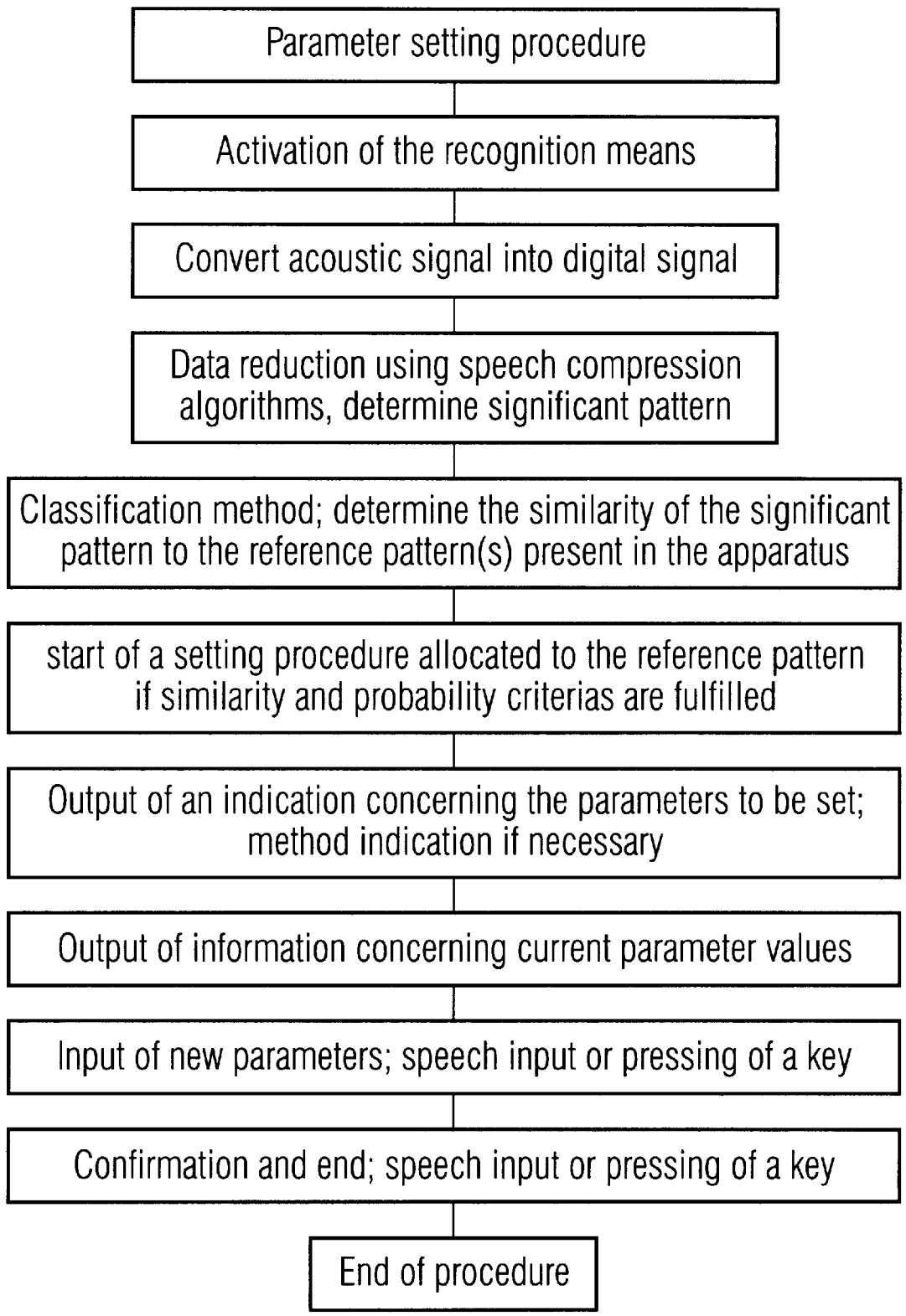

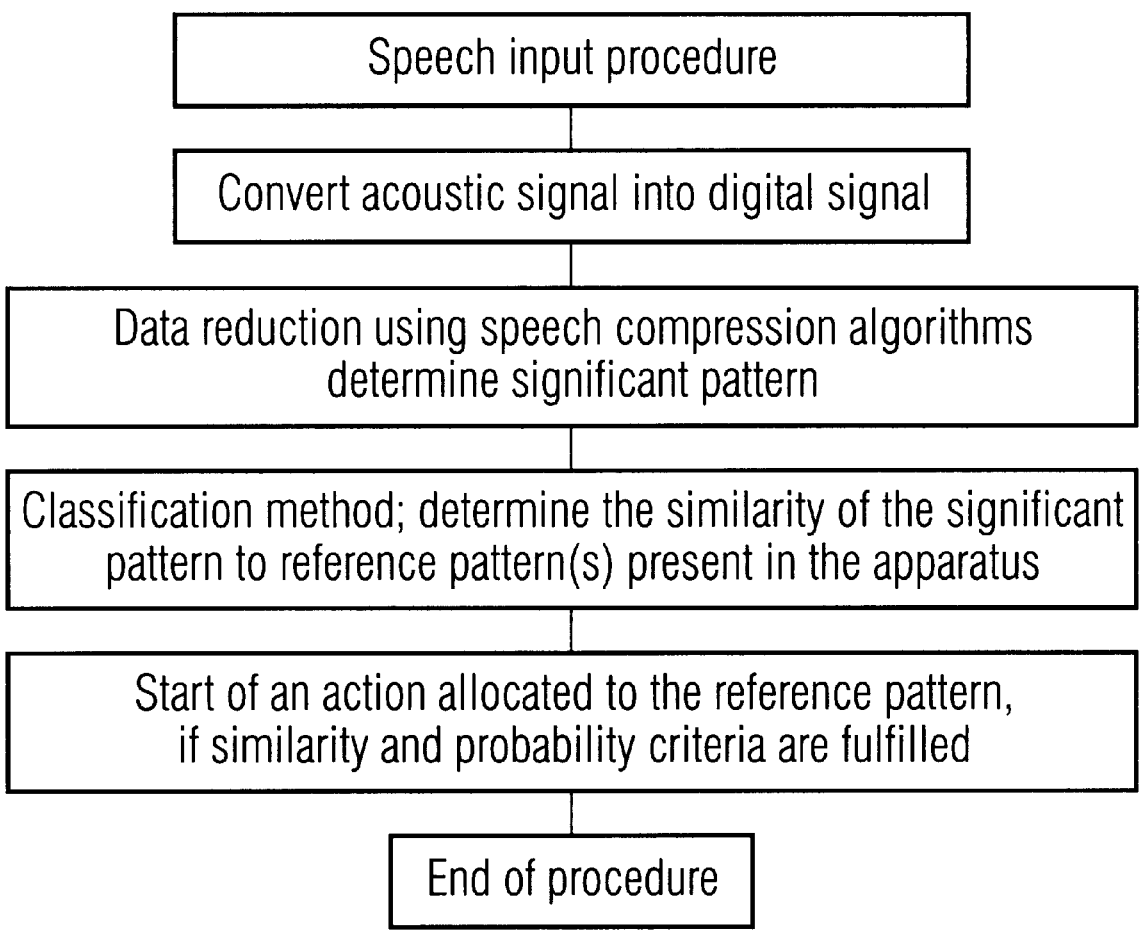

METHOD FOR SETTING TERMINAL SPECIFIC PARAMETERS OF A COMMUNICATION TERMINAL

Figure 1:
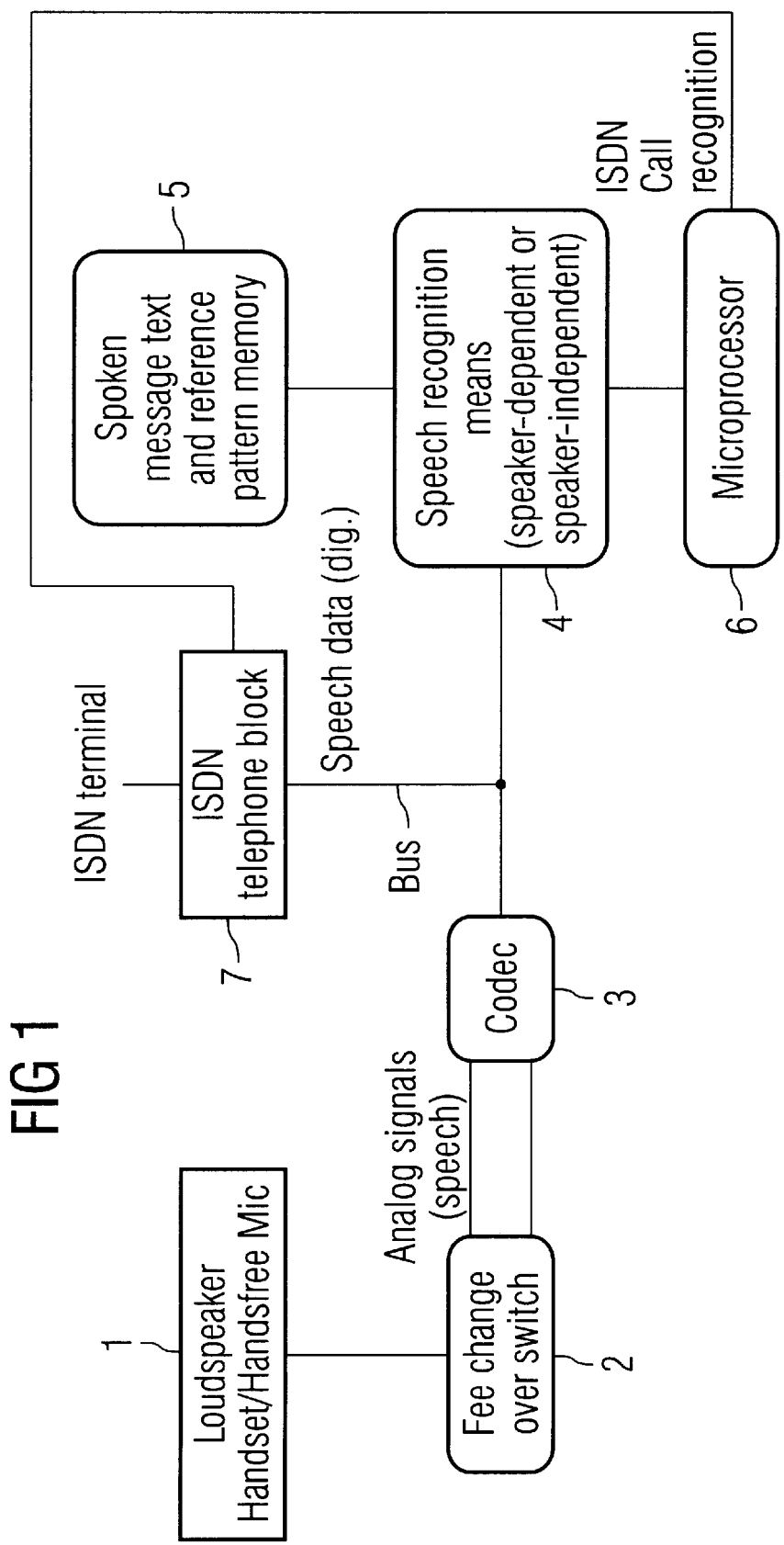

The present invention relates to a method for setting terminal-apparatus-specific parameters of a communication terminal apparatus by an operator.

In known methods, the operator inputs a character sequence via a keyboard of the terminal apparatus in order to achieve the state of modification for a particular parameter, whereupon, dependent on further key actuations, a control means carries out particular parameter settings allocated to these key actuations. In some communication terminal apparatuses, the operator is hereby supported only by an operator handbook, from which the operator can learn the key actuation sequence for the setting of a terminal-apparatus-specific parameter. Other communication terminal apparatuses with display means enable a menu-controlled setting of terminal-apparatus-specific parameters by displaying the respective current state of the control means or by requesting the actuation of desired keys with the aid of an alphanumeric display. However, due to the multiplicity of functions, performance features and parameters that can be adjusted, activated or deactivated in menu-controlled fashion, for such terminal apparatuses with display means the operator is also dependent on a user handbook in order to achieve the setting of terminal-apparatus-specific parameters in a desired menu level.

Communication terminal apparatuses are already known in which specific functions, such as the activation of performance features or the outputting of call numbers, can be controlled by speech commands with the aid of speech recognition means.

Thus, from the publication Elektrisches Nachrichtenwesen, Volume 59, No. 3, 1985, from the article "Spracherkennung und Sprachsynthese fur Dienste von Nebenstellenanlagen," H. Mulla, J. F. Vaughan, pages 273 to 280, a private branch exchange is known that enables a speech-controlled dialed call. Here, in particular the speech-controlled retrieval of performance features such as "transfer," "three-way conference," "hold" and "automatic callback" are described. In the same publication, in the article "Sprachgesteuerter Rufnummerngeber", M. Immendörfer, pages 281 to 285, a means is specified that, in addition to a telephone, can be connected to a telephone installation in order to enable a speech-controlled dialing process and in order to activate some user-friendly functional features, such as for example the performance feature "redialing."

From U.S. Pat. No. 5,335,261, in addition a radio telephone is known with a speech recognition means for the evaluation of dialing information inputted by means of speech and for the outputting of this dialing information.

EP 0 194 387 A2 additionally specifies a speech-controlled telephone for the speech-controlled outputting of a call number, whereby in a preferred construction the manner of functioning of a speech recognition means and the training process for matching the reference pattern of the speech recognition means to the specific utterance of an operator are specified in detail.

From DE 36 08 497 A1, a method is known for setting up a telephone connection via an operating means of a remote terminal apparatus, in particular of a car telephone, in which a user acoustically inputs a desired dialing destination using words and/or numerals via a microphone of the operating means, the acoustic input is evaluated in the operating means, a telephone connection is set up to the result of the evaluation in the operating means, and a synthetically produced speech output takes place via a loudspeaker of the operating means for acoustic user guidance. In addition, it is known that the operating means is activated by picking up a hand apparatus or by the spoken input of an activation command word via a separate microphone switched ready for operation, that the user is requested via the loudspeaker to input the dialing destination, that after the acoustic input of the dialing destination an evaluation takes place in a speech recognition and speech synthesis unit of the operating means, that a recognized dialing destination is acoustically confirmed to the user, and that an automatic connection setup takes place after a predeterminable lead time, if the user does not cause an interruption within the lead time by means of the acoustic input of a correction command word or by laying down the hand apparatus. In addition, it is provided that for the storing of dialing destinations, a user controls the speech recognition and speech synthesis unit into a storage mode by means of the acoustic input of a storage command word, that the storage mode is acoustically confirmed and that the user is requested to input a memory space number, that the inputted memory space number is acoustically confirmed, that the user is acoustically requested to make a spoken input of the subscriber name, that after the spoken input of the subscriber name has taken place the user is acoustically requested to input the associated call number, that after the input of the call number the user is again acoustically requested to make a spoken input of the subscriber name in order to initiate a recognition test that acoustically confirms to the user a correct recognition, acoustically repeats the dialing destination, and, after the user has given the acoustic confirmation, storage takes place under the indicated memory place number, and that, after the acoustic input of an end command word, the storage mode is switched off.

From DE 94 15 045 U1, a telephone apparatus is known in which the user is enabled to accept an incoming call even from a location spatially remote from the telephone apparatus, in which a handsfree means allocated to the telephone apparatus is remotely actuated by the input of speech, preferably by the speaking of a previously defined code word.

From EP 0 194 387 A2, a speech-controlled telephone is known that is able to learn the speech of the user by means of the visual representation of the speech commands spoken by the user in the form of words and numbers. In addition, the user of the telephone can store the names and call numbers of persons who are frequently to be dialed. When such a person is to be called, the user of the telephone utters only the corresponding name of the person to be called and a dialing command. For this speech-controlled dialing, in a first embodiment the telephone comprises a specific speech recognition circuit and a separate control means, as well as, in a further embodiment, a handsfree arrangement with a microprocessor-controlled speech recognition and a telephone controlling. For problem-free speech-controlled operation, in the telephone the speech sequences inputted by the user are compared with stored reference patterns (speech templates) before the stored call number belonging to the speech sequence is dialed after the input of a dialing command.

From U.S. Pat. No. 4,439,638, a function-producing system is known with a noise-activated control system for telephones, in which a reciprocal effect is provided between the caller and the receiver in the form of a feedback arrangement. The only treatment to be carried out here is the production of noises in the form of numerals or other symbols at the receiver end, and in the form of response numerals or other symbols at the caller end. By this means, the system becomes completely independent of pushbutton keys or dialing disks. By this means, it is in particular possible to avoid the use of these keys or dialing disks, not only at the calling and receiving apparatuses, but also at the switching centers. In the switching centers, an operator would even no longer be necessary, because the voice, or another noise at the calling end of the system, would trigger directly.

The object of the present invention is to indicate a method for setting terminal-apparatus-specific parameters of a communication terminal apparatus that is easy to operate and that operates reliably.

The invention achieves this object by means of a method with the method steps indicated in claim 1. Advantageous developments of the invention are indicated in the subclaims 2 to 23.

In addition, a method for the comfortable registering of a mobile communication terminal apparatus at a base station of a communication installation is to be indicated. A corresponding method has the method steps reproduced in claim 24 and can for example be developed according to claim 25.

The method according to claim 1 requires a speech recognition means for the conversion of acoustic signals into a data sequence and for the recognition of an agreement of at least one part of this data sequence with at least one reference pattern that corresponds to a particular speech command.

Such a speech recognition means can for example be activated by actuating a key or a switch at the terminal apparatus. However, it can also be activated automatically when a particular switching-oriented state is reached, such as for example "incoming call" or "line occupation." Upon activation of a speech recognition means of this sort, for example a speech signal transmission path is activated from a hand apparatus microphone or from a handsfree microphone to a coder/decoder, and sound waves inputted into the microphone are converted into an analog electrical signal and are transformed into a sequence of digital data words. From these items of information, for example a recognition means determines the speech parameters relevant for the recognition. These parameters can then be compared with stored reference patterns with the application of a classification method, whereby for example a similarity criterion is determined and a decision concerning sufficiently great similarity of the speech parameters of an inputted speech command with the reference pattern speech parameters is made. Dependent on a determined agreement, a control means, such as for example a microprocessor, can then use a corresponding control program to initiate an action that is fixedly allocated to the speech command, dependent on some boundary conditions if necessary.

According to the invention, after the activation of a speech recognition means by an operator, a speech command is inputted and the speech recognition means determines the agreement of this speech command with a speech command allocated to the particular terminal-apparatus-specific parameter. If there is an agreement between the inputted speech command and the speech command allocated to the particular parameter, a setting mode is activated for this parameter by the control means.

Such a control means is preferably contained in the communication terminal apparatus; however, it can also be coupled with this apparatus as an auxiliary apparatus, if necessary via the communication path or, respectively, signaling path of the terminal apparatus.

When the control means activates a setting mode for a parameter, the terminal apparatus emits a perceptible indication concerning this activated setting mode, or perceivably requests the operator to input a desired parameter setting. This perceivable indication can for example take place by means of the output of one or more stored speech phrases and/or by means of a display on a display means that is alphanumeric or that represents symbols. Given display of this indication, an acoustic signal can preferably additionally be emitted.

After the activation of a setting mode for a parameter, a desired parameter setting is inputted by the operator, whereupon the control means sets this parameter setting for the terminal apparatus. The input of a desired parameter setting can hereby be provided for example via keyboard or by means of a speech input.

In a development of the invention, the operator deactivates the setting mode by inputting an end command. The setting of a desired inputted parameter setting can hereby also be carried out by the control means dependent on the input of this end command. Such an end command can for example take place by pressing a star key or a pound key on the terminal apparatus. However, the end command can also take place by means of this speech input of a particular speech command, such as for example "stop," "end" or the like.

In constructions of the invention, it can be provided that reference patterns are present in stored form only for a very limited number of speech commands. This is to be recommended in particular given storing in the terminal apparatus.

This limited number can for example consist of particular words for expressing agreement or refusal, such as for example "yes" and "no," or else of particular letters or numerals.

In this case, in a development of the inventive method the terminal apparatus can emit, before the inputting of the speech command, a perceivable indication concerning a particular terminal-apparatus-specific parameter whose setting mode can be activated by inputting a first particular speech command (e.g. "yes"). In a development of this method, the terminal apparatus can then emit, dependent on the input of a second particular speech command (e.g. "no"), a perceivable indication concerning another terminal-apparatus-specific parameter whose setting mode can be activated by inputting the first particular speech command.

In a further constructive form of the method, before the input of the speech command the terminal apparatus can emit a perceivable indication concerning several particular terminal-apparatus-specific parameters, as well as concerning speech commands respectively allocated to these parameters, by means of whose input the setting mode for the allocated parameter can respectively be activated. Thus, the operator can be requested, for example by display or by a spoken message, to input a first control command in order to activate a modification mode for a first parameter, to input a second control command in order to activate a modification mode for a second parameter, to input a third control command in order to activate a setting mode for a third parameter, etc.

As a settable parameter, in a development of the invention for example the contrast of a display unit of the terminal apparatus can be provided. In this case, one of several contrast stages can be provided as a parameter setting that can be inputted.

In addition, with the aid of further method steps, the parameters volume of the bell tone of the terminal apparatus, melody of the bell tone, or the dialing method of the terminal apparatus can for example advantageously be set. A further adjustable parameter is the allocation of the terminal apparatus to a subscriber. In known private branch exchanges, a terminal apparatus can be allocated to a subscriber by means of an input of a particular longer key sequence and subsequent inputting of a personal identification number of a subscriber (PIN). With the use of the inventive method, the state of modification for the allocation of the terminal apparatus to a subscriber is achieved by inputting a speech command, whereupon for example the personal identification number of the subscriber can then be provided as a desired parameter setting. In addition, if the terminal apparatus is in a blocked state that it can leave only after the input of an identification number, the terminal apparatus can be placed into the input state for the input of the identification number by means of the input of a correspondingly allocated speech command.

A further case of application for the invention is the inputting of a call number into a call number memory, for example into the call number memory of an electronic telephone book. In this case, the parameter is the content of a call number memory. It is hereby particularly advantageous if the speech recognition means is activated by means of line occupancy, i.e., by means of pressing a key that effects a line occupation on a mobile terminal apparatus or wireless terminal apparatus, by pressing the handsfree key on an added-feature telephone, or by lifting the handset, thereby causing actuation of a cradle switch. If a specific speech command is hereby inputted before the input of a call number, the setting mode for the addition of a call number to the call number memory is activated. The inputted call number is thereby treated as a parameter setting and is stored in the call number memory. If the specific speech command is not recognized, an inputted call number is not stored, but rather is outputted, e.g. as dialing information.

A further aspect of the invention is concerned with a method for line occupancy at a communication terminal apparatus. In this method as well, a speech recognition means is activated for the recognition of a speech command, a speech command is inputted by an operator, and the agreement thereof with a speech command allocated to a line occupancy is determined by the speech recognition means. If the inputted speech command agrees with a speech command provided for a line occupation, the line is occupied. This method makes it possible to telephone in completely hands-free manner. It is recommended above all with the use of a handsfree means or with the use of a hearing and speaking means worn at the head. If this method is to be used for outgoing calls, it is recommended to activate the speech recognition means at the beginning of a telephone session, for example by actuating a key at the terminal apparatus. A deactivation of the speech recognition means can then take place for example by means of renewed actuation of the same key, by actuation of another key or key combination, or automatically, dependent on the time span that has elapsed since the last use of the terminal apparatus. However, the input of a speech command that effects a breaking off can also be provided for the deactivation of the speech recognition means.

If the last-described method is used for line occupation given an incoming call, then in a preferred construction the activation of the speech recognition means is coupled to the signaling of an incoming call. If the speech recognition means is automatically activated given an incoming call, an operator can effect a line occupancy by inputting a speech command provided for this purpose, such as for example "occupy." In a development of the named method, the speech recognition means is activated only during the call pauses. By this means, the unnecessary comparison of the bell tone signal with any reference patterns of speech commands is avoided.

A further aspect of the intention relates to a method for registering a mobile communication terminal apparatus, such as for example a wireless terminal apparatus according to DECT, at a base station of a communication installation. In this method, a speech recognition means is activated for the conversion of acoustic signals into a data sequence and for the recognition of an agreement of at least one part of this data sequence with at least one reference pattern corresponding to a particular speech command. In an advantageous constructive form of the method, this activation can take place by means of line occupation.

Given an activated speech recognition means, an operator inputs a speech command and the speech recognition means determines the agreement of this speech command with a speech command allocated to the introduction of a registration process. If an agreement is hereby determined, a control means introduces a registration sequence.

By means of this last-named method, in particular the registration of mobile terminal apparatuses of various types or, respectively, various manufacturers at one communication installation is unified, since no terminal-apparatus-specific introduction procedures need be inputted for a registration process.

In the following the invention is explained in more detail on the basis of a preferred embodiment with reference to the terminal apparatuses shown in the figures.

Figure 2:
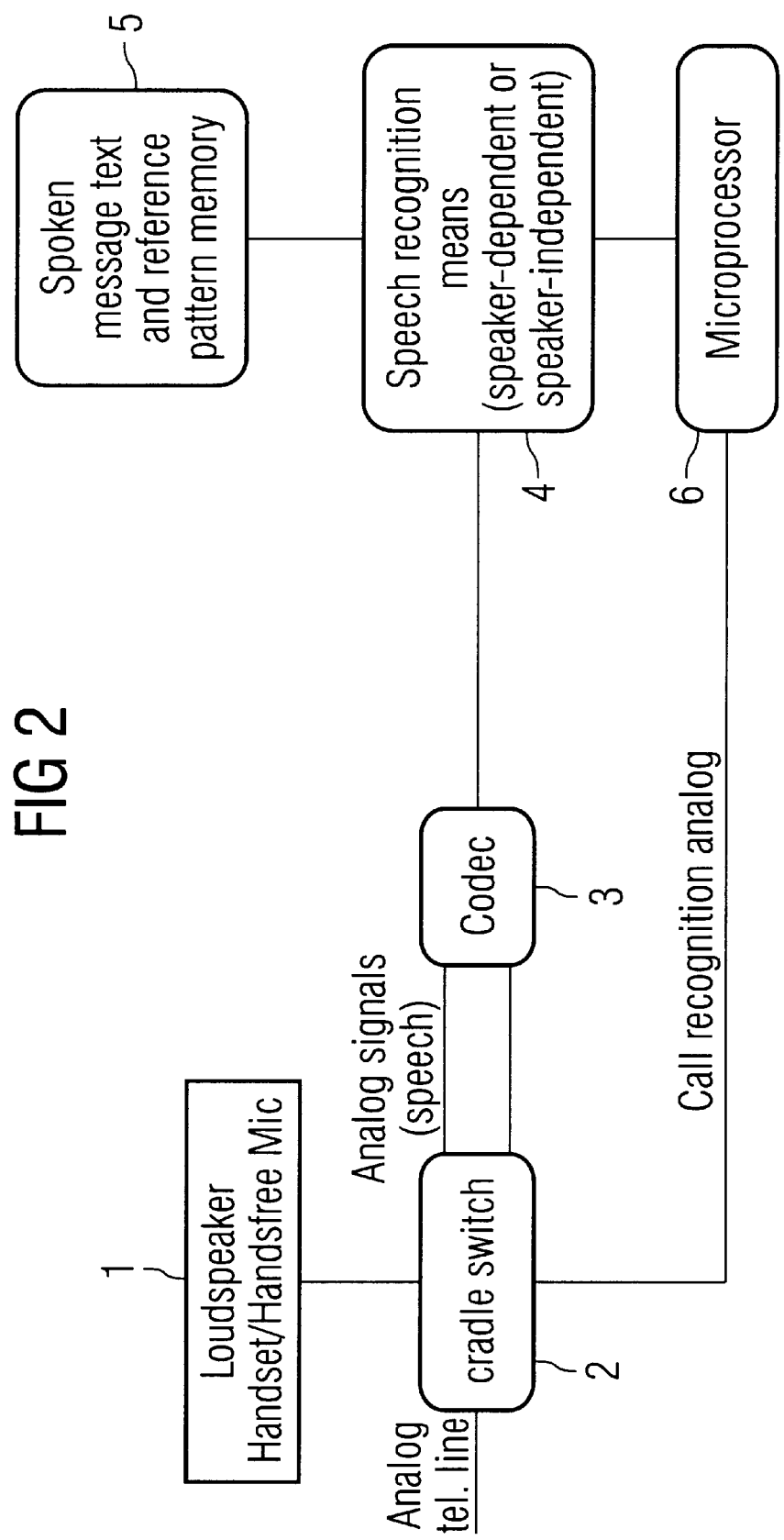

FIG. 1 hereby shows the block switching diagram of a terminal apparatus for the execution of one of the inventive methods with digital signal transmission, and FIG. 2 shows the block switching diagram of a terminal apparatus for the execution of one of the inventive methods with analog signal transmission, FIG. 3 shows a flow diagram of a method for parameter setting and FIG. 4 shows a flow diagram of a method for speech input.

FIG. 1 shows the block switching diagram of a terminal apparatus for the execution of the named inventive method with digital signal transmission, such as for example ISDN. This terminal apparatus contains an electroacoustic transducer unit 1 for the conversion of acoustic signals into analog electrical speech signals and for the conversion of analog electrical speech signals into acoustic signals. This electroacoustic transducer unit 1 can for example be a hand apparatus, a hearing/speaking apparatus worn at the head, or the microphone and the loudspeaker of a handsfree telephone. In the embodiment shown, this electroacoustic transducer unit 1 is coupled with a coding/decoding means 3 via a cradle switch 2. In this coding/decoding means, analog signals (speech) AS coming from the electroacoustic transducer 1 are converted into digital signals, and digital signals DS going out to the electroacoustic transducer 1 are converted into analog signals. The digital signal input/output of the coding/decoding means 3 is connected with a speech recognition unit 4. The speech recognition unit 4 is coupled with a memory means 5 for the storage of spoken texts and/or reference patterns, and is connected in addition with a control means 6, for example a microprocessor.

The functional blocks 1 to 6, described with reference to FIG. 1, and their described effect are provided identically in the terminal apparatus for analog signal transmission according to FIG. 2.

For digital signal transmission, the terminal apparatus according to FIG. 1 additionally contains an ISDN telephone block 7, which is connected via a speech data bus SDB with the input/output for digital signals of the coding/decoding means 3, as well as with the speech recognition means 4. In addition, the ISDN telephone block 7 is connected with the control means 6 via a control bus STB, for example for the transmission of the call recognition. The ISDN telephone block 7 has an interface to a digital communication network. Among other things, the control means 6 acquires the state of the cradle switch 2.

The terminal apparatus for analog signal transmission according to FIG. 2 does not contain an ISDN telephone block 7. Instead, the cradle switch 2 is connected with the control means 6 via the control bus STB not only for the monitoring of its state, but also among other things for analog call recognition. In addition, the cradle switch 2 is connected with an analog communication network via an interface.

In an embodiment of the method for the setting of terminal-apparatus-specific parameters of a communication terminal apparatus, the speech recognition means 4 is activated for the conversion of acoustic signals into a data sequence, for the extraction of relevant speech parameters from this data sequence, for the comparison of these speech parameters with reference patterns, and for the determination of the agreement of an inputted speech command with a speech command whose reference patterns are stored.

After the activation of the speech recognition means 4, an operator inputs an acoustic speech command via the electroacoustic transducer 1. This speech command is converted into an analog electrical signal in the electroacoustic transducer 1, and is connected to the coding/decoding means 3 via the cradle switch 2. In an advantageous construction, an amplifier chain (not shown) is contained in this signal path.

In the coding/decoding means 3, the analog electrical signal is converted into a digital signal, and is supplied to the speech recognition means 4 as a data sequence. The speech recognition means 4 extracts specific patterns from the data sequence and compares these patterns with reference patterns stored in the memory means 5. Dependent on this comparison process, the speech recognition means determines an agreement of an inputted speech command with a speech command provided for the activation of the setting mode for a particular terminal apparatus-specific parameter, and gives a corresponding message to the control means 6. If agreement is present, the control means activates the setting mode for the corresponding parameter and causes the output of a speech phrase stored in the memory means 5 to the loudspeaker of the electroacoustic transducer 1 via the coding/decoding means 3 and via the cradle switch 2. This text contains either an indication concerning the activated setting mode or a request for the input of a desired parameter setting. The operator thereupon inputs a desired parameter setting by speech input, which is then routed, via the electroacoustic transducer means 1 and the coding/decoding means 3, to the speech recognition means 4, and thereupon to the control means 6. Alternatively, the desired parameter setting can also be inputted via a keyboard (not shown) and routed to the control means 6. The control means 6 then sets the desired parameter setting for the terminal apparatus. For the deactivation of the setting mode, the operator inputs an end command. This end command can for example take place by means of speech input via the electroacoustic transducer 1, the coding/decoding means 3, the speech recognition means 4 and the control means 6, or by the actuation of at least one key at the terminal apparatus.

FIG. 3 shows a flow diagram of a procedure for parameter setting. A recognition means for the conversion of acoustic signals into a data sequence and for the recognition of an agreement of at least one part of this data sequence with at least one reference pattern corresponding to a particular speech command is hereby first activated, for example by pressing a key, actuating the cradle switch, or a trigger signal of a threshold comparator. An acoustic signal is thereupon converted into a digital electrical acoustic signal by means of electroacoustic transformation and by means of analog/digital conversion. In a next step, the transformed signal is subjected to a data reduction method with the aid of a suitable speech compression algorithm, in order to obtain a significant signal pattern. In a subsequent classification method step, the similarity of this significant pattern to reference patterns stored in the apparatus is checked. If there is no similarity, the sequence comes to an end (not shown). If, taking into account probability criteria if necessary, a similarity is determined between the current pattern and a stored pattern, then in a subsequent step a setting procedure allocated to this stored pattern is started for a selected parameter. In a next step, an indication concerning the selected parameter is outputted. In addition, an item of information concerning the current parameter values is outputted. In a next step, an inputting of new parameters takes place. This can take place by means of speech input or by pressing a key.

In order to terminate the input of a parameter value or, respectively, to confirm a displayed parameter value, a confirmation method step is executed. This step can also take place by means of speech input or by pressing a key. The parameter setting procedure is terminated with the processing of the confirmation input.

FIG. 4 shows the flow diagram of an embodiment for a speech input. In a first step, an item of acoustic information is hereby inputted, is converted into an electrical signal in an electroacoustic transducer, and is converted into a digital acoustic signal by means of analog/digital conversion. In a next step, the data reduction of the transformed acoustic signal takes place with the aid of a suitable speech compression algorithm, and a significant pattern of the acoustic signal is determined. In a subsequent classification method step, the similarity of the obtained significant pattern is determined with at least one reference pattern stored in the apparatus.

If, taking into acoustic probability criteria if necessary, no similarity is determined, the method is terminated. If a similarity of the current significant pattern with a stored reference pattern is determined, then an is action allocated to this reference pattern is started. This speech input method is thereby terminated.

What is claimed is:

1. A method for setting a terminal-specific parameter of a communication terminal, comprising the steps of:

activating a speech recognition unit for conversion of acoustic signals into a data sequence and for recognition of an agreement of at least one part of said data sequence with at least one reference pattern corresponding to a particular speech command allocated to said particular terminal-specific parameter;

inputting with an operator a speech command and determining by the speech recognition device whether there is agreement between the operator input speech command and said particular speech command allocated to said particular terminal-specific parameter;

if agreement is determined, activating with a control unit a setting mode for said specific parameter;

outputting from the terminal at least one of a perceivable indication concerning the activated setting mode and a request for input by the operator of a desired setting for said specific parameter; and if the operator inputs the desired setting, said control unit then implementing the desired setting of the specific parameter.

2. The method according to claim 1 wherein the activation of the speech recognition unit occurs by actuation of at least one key at the terminal.

3. The method according to claim 1 wherein the speech recognition unit is activated by means of the achieving of a particular switching-oriented state of the terminal.

4. The method according to claim 1 wherein before input of the operator speech command, the terminal outputting a perceivable indication concerning the particular terminal-specific parameter whose setting mode is to be activated by inputting a first speech command.

5. The method according to claim 4 wherein dependent on input of a second speech command by the operator, the terminal outputs a perceivable indication concerning another particular terminal-specific parameter whose setting mode can be activated by inputting of the first particular speech command.

6. The method according to claim 1 wherein before the input of the speech command by the operator, the terminal outputs a perceivable indication concerning several particular terminal-specific parameters as well as concerning speech commands respectively allocated to said parameters, by means of input of which a setting mode for the allocated parameter can respectively be activated.

7. The method according to claim 1 wherein the inputting of the desired parameter setting by the operator takes place at the terminal with the aid of a keyboard.

8. The method according to claim 1 wherein the input of the desired parameter setting takes place by means of the input of a speech command.

9. The method according to claim 1 wherein the control unit sets the specific parameter after the input of an end command.

10. The method according to claim 9 wherein the end command is input by means of actuation of a particular key at the terminal.

11. The method according to claim 9 wherein the end command is input by means of inputting of a particular speech command.

12. The method according to claim 1 wherein the specific parameter is contrast of a display unit of the terminal.

13. The method according to claim 12 wherein the specific parameter that is input is one of several contrast stages.

14. The method according to claim 1 wherein the specific parameter which is set is loudness of a bell tone.

15. The method according to claim 14 wherein the specific parameter which is set is melody of the bell tone.

16. The method according to claim 1 wherein the specific parameter that is set is dialing method.

17. The method according to claim 1 wherein the terminal-specific parameter that is set is allocation of the terminal to a subscriber whereby the desired parameter setting takes place by input of a personal identification number of the subscriber to whom the terminal is to be allocated.

18. The method according to claim 1 wherein the terminal-specific parameter that is set is content of a call number memory, the speech recognition unit is activated by means of line occupation, a setting mode for addition of a call number to the call number memory is activated by input of a specific speech command, and an input call number is regarded as a parameter setting and is stored in the call number memory if the specific speech command takes place before input of the call number.

19. The method according to claim 1 wherein the terminal visually outputs perceivable indications with aid of a display unit.

20. The method according to claim 1 wherein the terminal outputs perceivable indications acoustically by reproduction of stored speech phrases.

21. The method according to claim 20 wherein the speech phrases are stored in the terminal.

22. The method according to claim 1 wherein the speech recognition unit is automatically activated given an incoming call.

23. The method according to claim 22 wherein the speech recognition unit is activated during call pauses.

* * * * *